(12) United States Patent
Perrine

(10) Patent No.: US 6,231,898 B1
(45) Date of Patent: May 15, 2001

(54) SANDWICH PRODUCT AND METHOD FOR MAKING SAME

(76) Inventor: Paul M. Perrine, 46 Hohaia Street, Matamata (NZ)

( * ) Notice: Subject to any disclaimer, the term of this patent is extended or adjusted under 35 U.S.C. 154(b) by 0 days.

(21) Appl. No.: 09/138,600

(22) Filed: Aug. 22, 1998

(51) Int. Cl.[7] .................................................. A21D 13/00
(52) U.S. Cl. ........................... 426/94; 426/274; 426/275; 426/502
(58) Field of Search .............................. 426/94, 274, 275, 426/502

(56) References Cited

U.S. PATENT DOCUMENTS

| | | | | |
|---|---|---|---|---|
| 3,083,651 | * | 4/1963 | Cooper | 426/275 |
| 3,494,302 | * | 2/1970 | Wolf et al. | 426/275 |
| 3,690,898 | * | 9/1972 | Partyka | 99/86 |
| 3,769,035 | * | 10/1973 | Kleiner et al. | 426/244 |
| 4,382,768 | * | 5/1983 | Lifshitz et al. | 425/510 |
| 4,919,946 | * | 4/1990 | Pak et al. | 426/89 |
| 5,405,256 | * | 4/1995 | Dalton | 425/343 |
| 5,736,180 | * | 4/1998 | Peifler et al. | 426/138 |
| 5,853,778 | * | 12/1998 | Mayfield | 426/89 |
| 5,928,692 | * | 7/1999 | Mayfield | 428/89 |

* cited by examiner

Primary Examiner—Nina Bhat
(74) Attorney, Agent, or Firm—Robert R. Mallinckr; Mallinckrodt & Mallinckrodt

(57) ABSTRACT

A sandwich product is made by sealing the peripheral portions or edges of two slices or layers of bread together to form a substantially sealed pocket between the layers with filling material in the pocket. The sealing takes place without heat, and prevents cheese, sauce, or other filling ingredients from running out of the product upon heating of the product. Markings may be pressed into the product which form subpockets and restrict the flow of filling ingredients between subpockets. Score lines may also be formed to divide the product into multiple pockets which may be easily separated into separate pieces of the product.

Figure 1:
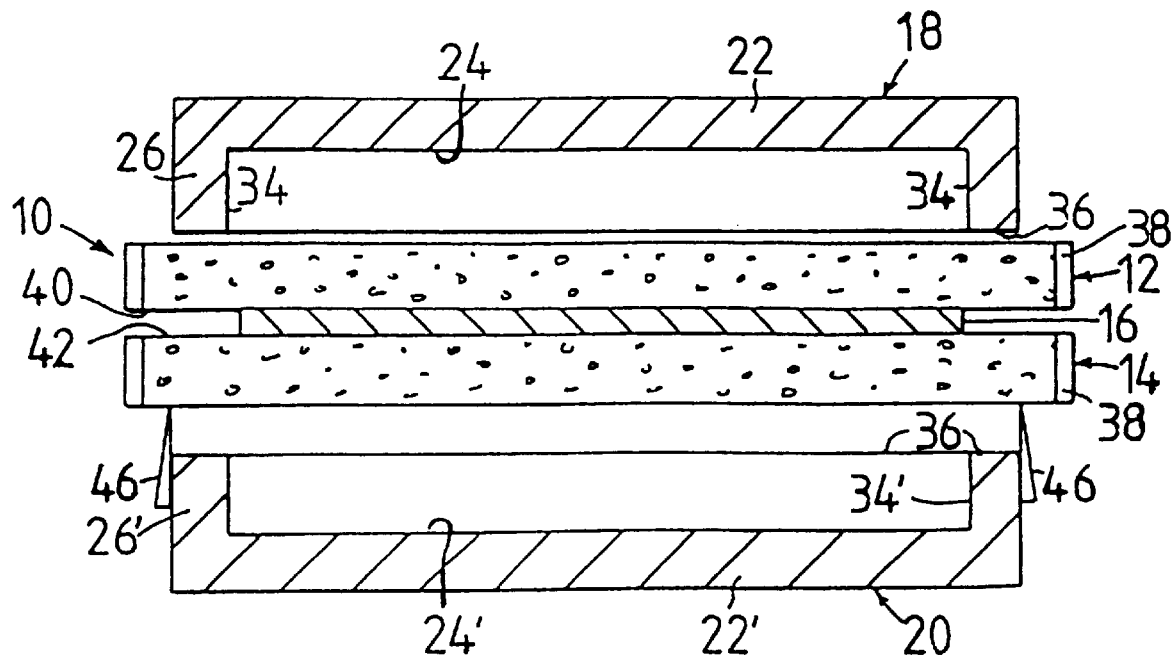

15 Claims, 6 Drawing Sheets ical cations or recesses are molded into
SANDWICH PRODUCT AND METHOD FOR MAKING SAME

BACKGROUND OF THE INVENTION

1. Field

This invention relates to food products. The invention envisages a method for producing sandwiches, particularly sandwiches which are toasted or otherwise heated prior to being consumed.

For the sake of avoiding repetition, the term "sandwich" will be used throughout this specification and the claims to include a food product comprising two or more layers of bread which are brought together with an edible filling of any suitable kind therebetween. The layers may take the form of separate slices of bread cut from a conventional loaf or a single such slice folded over on itself. However, the layers may also take any other suitable form. They may, for example, particularly but not necessarily exclusively in a commercial operation, be formed from pieces of bread dough which are made into a desired shape before they are baked so that, after baking, they do not need to be cut or further shaped (other than for the removal of crust) before being used to make the sandwich. One such desired shape may be that of a conventional slice of bread.

Furthermore, the term "bread" is used in a broad sense in this specification and claims. It is used essentially to imply that the product is pre-baked or otherwise cooked before it is used for carrying out the method of the present invention. It is intended to include in particular any suitable bread-like product which incorporates baked dough as an essential ingredient and which is used to make a sandwich according to the methods of the present invention.

2. State of the Art

There is, of course, a well-known technique for making toasted sandwiches. Commercially available devices are provided for the purpose. These devices conventionally comprise a pair of plates which are joined together by hinges or the like so that they can be pivoted to an operational position in which the working face of the first plate faces the working face of the second plate. In use, a sandwich is placed between the plates, in contact with the working faces. The plates are then heated and the sandwich is toasted by the heat which is transmitted through the working faces to the sandwich.

Conventional such devices work best when the thickness of the sandwich is somewhat greater than the gap between the working faces. The sandwich is thus squeezed between the working faces which improves the contact, and hence the efficiency of heat transfer, between the plates and the sandwich. However, there is clearly a practical limit as to how much the sandwich can be squeezed since excess squeezing will not only tend to eject the filling from the sandwich (especially if the filling comprises a substance such as cheese which melts when it is heated) but will also have a deleterious effect on the quality of the sandwich.

The working faces of most conventional devices of this kind are flat. However, cavities or recesses are molded into the working faces of some such devices. The bulk of a sandwich is accommodated in a cavity of this kind, the edges of the sandwich overlapping the periphery of the cavity. The edges of the sandwich are thus squeezed between the portions of the working surfaces bordering the cavity and, when the toasted sandwich is removed from the edge, the edges are often found to be sealed together. This sealing is, however, achieved by the applied heat. This can be demonstrated by separating the plates before the heat is applied. It is then found that the squeezed edges are not fused together and easily become separated especially if an attempt is made to heat the sandwich without returning it to the aforementioned toasting device. Any liquid in the filling will run out if the sandwich is turned on its edge.

Bread toasting appliances wherein a slice of bread is positioned vertically on an edge in the appliance for toasting are in common use but are not generally used for heating sandwiches because the sandwich filling generally falls out of the sandwich when placed in a vertical position.

The applicant believes that there is a need for a sandwich product which can be supplied to users ready to be toasted or cooked in some manner, such as by microwave, a conventional oven, frying pan or grill, or common toasting appliance. However, if such a product is to be acceptable, it is essential that it must be capable of being handled during manufacture, packaging, transport, unpackaging, and cooking without falling apart. It must further be such that cheese, sauce, or any other substance in the filling should not be able to escape when it melts or becomes less viscous upon being heated. This is important to prevent the cheese, sauce, or other substances in the filling from running out of the sandwich product into an oven, pan, or toaster during heating of the product, particularly when heating is accomplished by positioning the sandwich product substantially vertically on an edge in a common toaster appliance. Most of such toasters are of the radiant heat type which reduces the time required to brown the outside and to heat the ingredients to about 1.5 to 3 minutes.

In an earlier attempt to provide an acceptable sandwich product, the inventor of the present invention has proposed to glue together the two slices of bread in a sandwich, using an edible glue. These proposals are set out in international patent application Serial No. PCT/NZ93/00104.

One drawback of gluing the slices together is that, although the layers are bonded together at lower temperatures, any meltable ingredients of the filling are still able to escape when they melt or becomes less viscous upon being heated. This limits the choice of ingredients.

SUMMARY OF THE INVENTION

According to the invention, there is provided a method of producing a food product comprising the steps of bringing together two layers of baked bread and using pressing apparatus to cold press edge portions of the layers together so that interfacing portions of the layers adjacent the edge portions become bonded together and remain bonded when the product is removed from the pressing apparatus.

The pressing operation can be carried out with pressing tools at ambient temperature. Although it might under some circumstances be beneficial (for example, to avoid the bread sticking to the pressing apparatus) to gently warm the pressing apparatus, or at least those parts which press the edge portions of the layers together to effect the bond, it is not in any case necessary either to heat the apparatus to the temperature at which the product will begin to be cooked, or to heat the product to the extend that cooking commences.

One beneficial aspect of cold pressing the layers in order to bond them together is that no heat is wasted. The heat which would be applied in other processes for this purpose would be wasted as it must be removed during the subsequent chilling or freezing of the product.

In one form of the invention, a filling is inserted between the layers before the interfacing portions are bonded together, the filling being sealed between the two layers by the bonded interfacing portions. The filling may be as simple as, for example, garlic butter. However, the invention allows for fillings of a wide variety of foodstuffs, or mixtures of foodstuffs. Moreover, as appears in greater detail herein, fillings which have been developed specially for use with the present invention may be used.

According to one aspect of the invention the product is prepared by cutting a loaf of bread along its length to form a slice which is folded on itself to form the two layers. In an alternative form of the invention, the two layers are constituted by two slices cut from a loaf of bread. In most commercial operations the loaf would be passed through a machine which, in one pass would cut the loaf into a multiplicity of slices.

In one optional form of the invention, crust is removed from the layers. The crust removal may take place at any convenient stage but is conveniently effected at substantially the same time as the edge portions are pressed together and by the same pressing apparatus.

The layers may be of square, rectangular, triangular, round, curved, trapezoidal or any other suitable shape.

According to one aspect of the invention, decorative markings such as simulated grill marks or heat marks are printed or otherwise applied to the outer face of at least one of the layers. It is advantageous in some instances where a filling runs easily when heated to press markings into the sandwich so that such markings cause restriction to filling flow between the opposed bread layers. This keeps the filling more evenly distributed between the bread layers during toasting of the sandwich product. Further, if desired, the product can be scored and perforated to enable it to be easily broken into smaller pieces.

Advantageously, the invention includes the further step of chilling or freezing the product after it is produced.

In one form of the invention the filling includes a layer comprised of at least one foodstuff which is or has been divided into pieces which are held together by a binding agent. The binding agent may advantageously be gelatin or a similar agent which is cohesive when it is chilled and which melts when the product is heated prior to consumption.

The pressing apparatus advantageously comprises at least one roll which presses the edge portions together with a rolling action.

The invention allows for a wide variety in the thickness of the fillings. When the filling is thick the bread must be stretched over the edges of the filling, requiring a stronger seal. The invention contributes materially to the strength and integrity of the seal.

It is intended that the scope of the invention should cover a food product whenever it is prepared by a method as disclosed and claimed herein.

THE DRAWINGS

Figure 2:
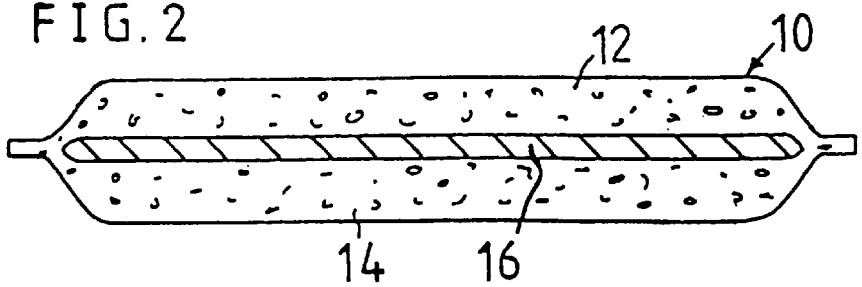
Figure 3:
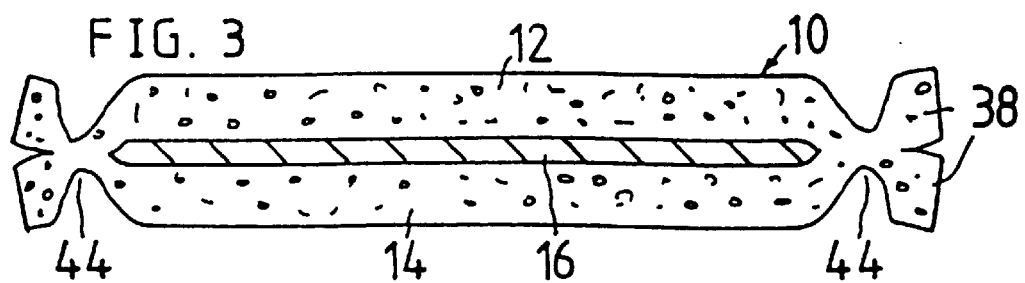
Figure 4:
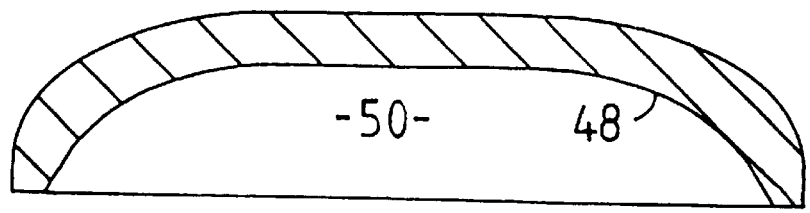
Figure 5:
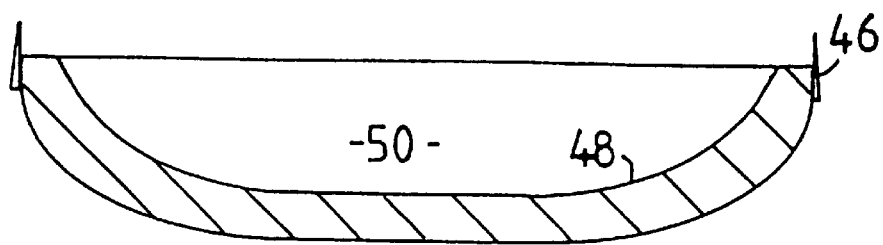
Figure 5:
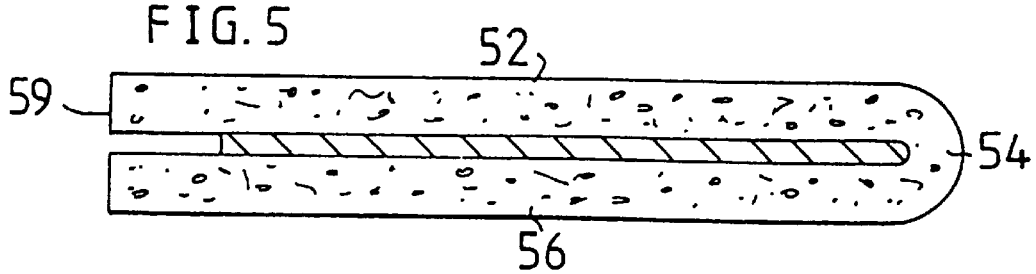
Figure 8:
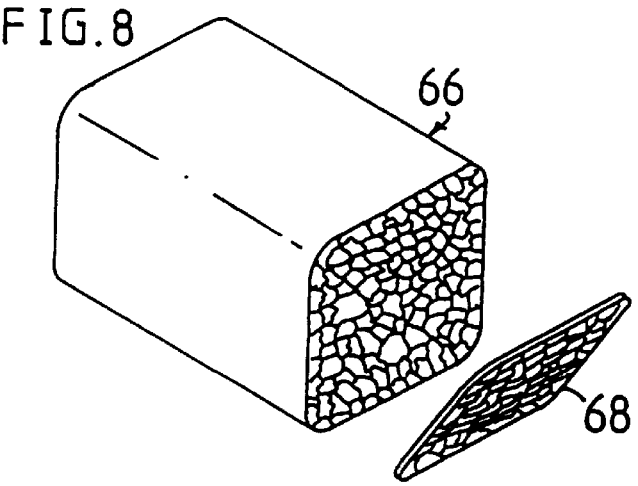
Figure 6:
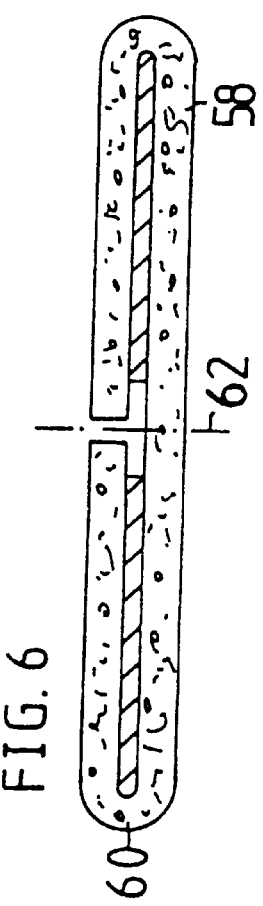
Figure 7:
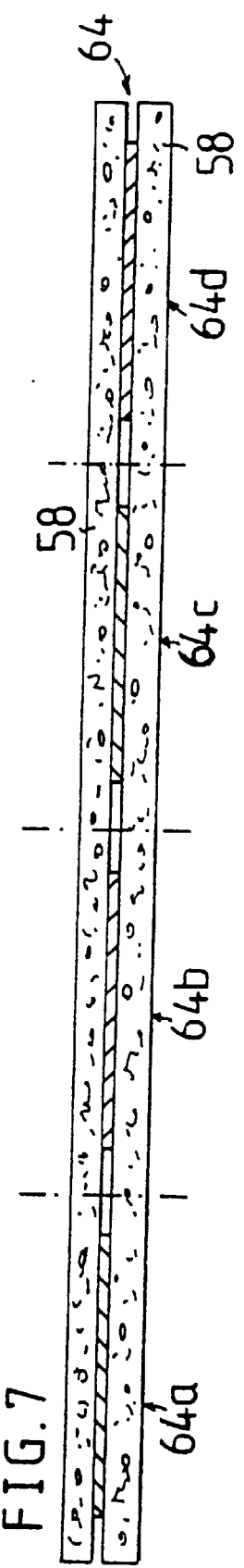
Figure 9:
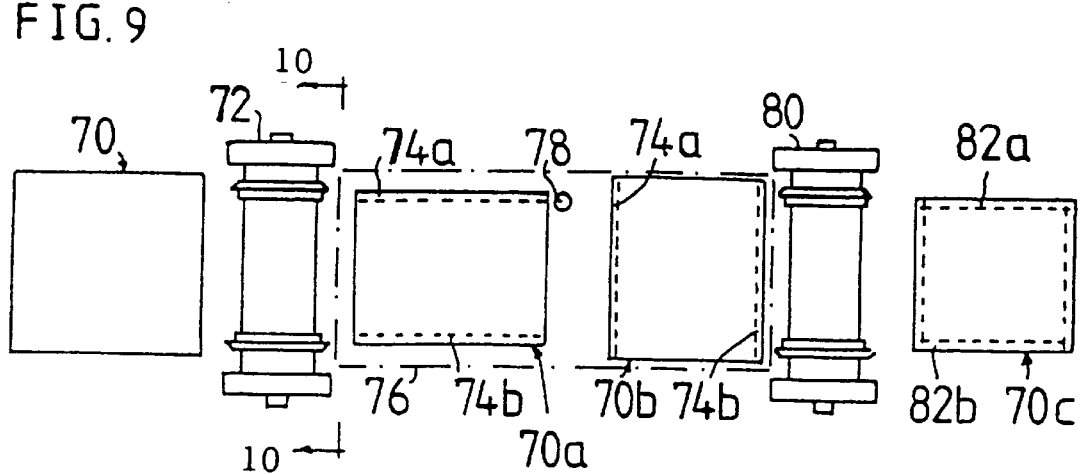
Figure 10:
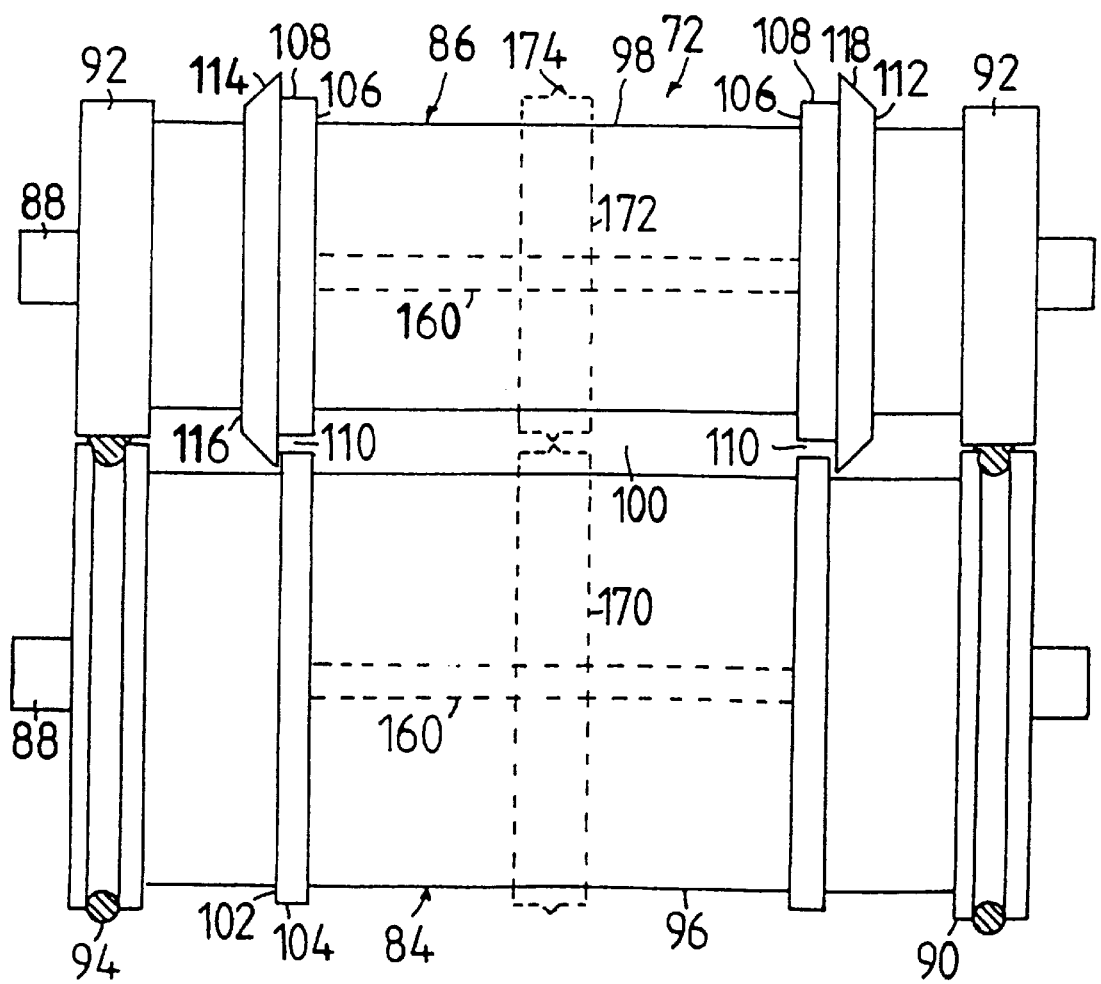
Figure 11:
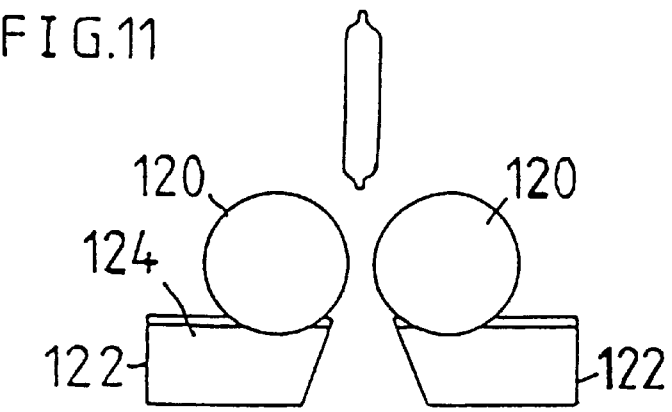
Figure 13:
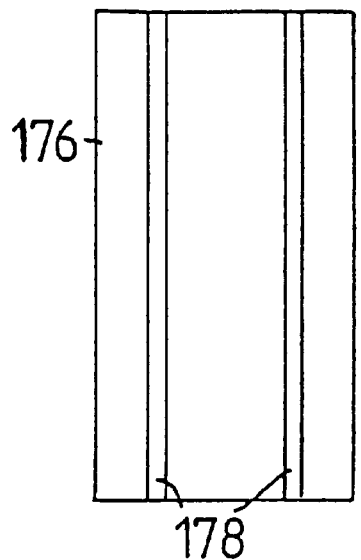
Figure 12:
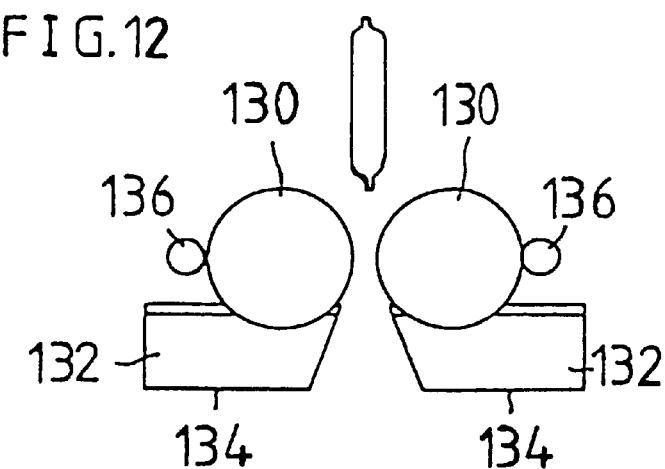
Figure 14:
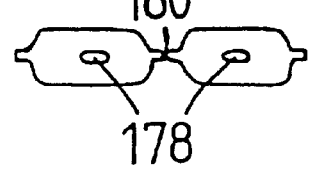
Figures 15, 16:
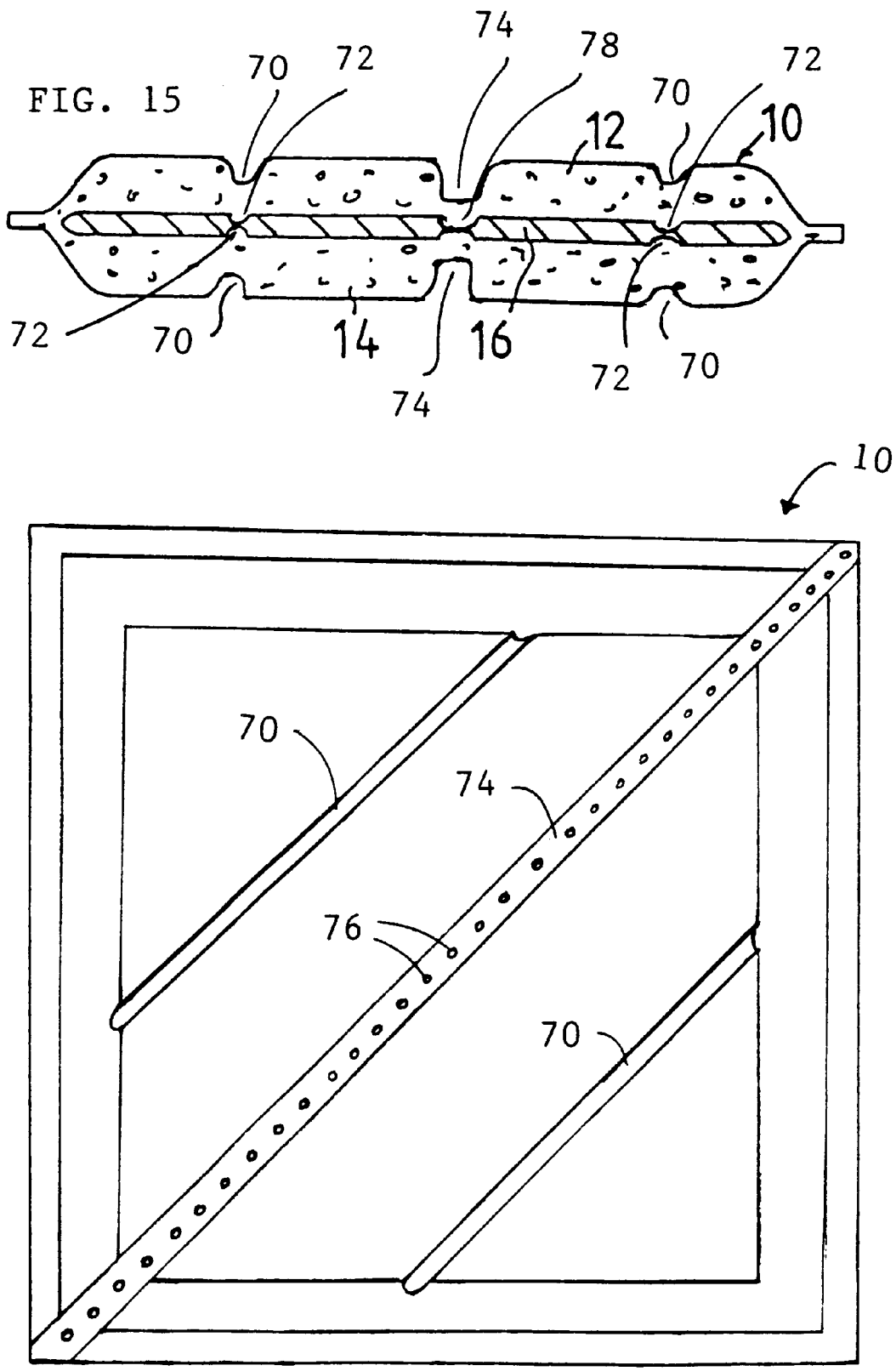

The best mode presently contemplated for carrying out the invention is illustrated in the accompanying drawings, in which:

FIG. 1 is a schematic sectional view of a sandwich before being pressed between a pair of opposing pressing tools by advancing one tool towards the other;

FIG. 2, a vertical section through a sandwich after it has been pressed and the crusts removed;

FIG. 3, a vertical section through a sandwich which has been pressed without having its crusts removed;

FIG. 4, a schematic side view of a pair of modified pressing tools incorporating cavities to enable the sandwich to be shaped and cutters for removing the crusts;

FIGS. 5 to 7 each show sandwiches made from a single slice of bread;

FIG. 8, a perspective view of a product for use as a filling for the sandwiches;

FIG. 9, a schematic plan view of an arrangement of roll assemblies through which sandwiches are passed for pressing their edges together;

FIG. 10, a more detailed view, on Arrow 10—10 in FIG. 9, of one of the roll assemblies;

FIG. 11, a schematic side view of a pair of rolls for applying grill marks to the sandwiches;

FIG. 12, a schematic side view of a pair of rolls for applying flavored butter to the outer faces of the sandwiches;

FIG. 13, a plan view of a slice of bread to which beads of garlic butter have been applied;

FIG. 14, an end view of a sandwich made up from the slice of bread shown in FIG. 13;

FIG. 15, a vertical section similar to that of FIG. 2 showing markings pressed into the faces of the sandwich and a score in the sandwich; and FIG. 16, a top plan view of a sandwich with decorative markings and a score line thereon.

DETAILED DESCRIPTION OF THE ILLUSTRATED EMBODIMENT

In FIGS. 1 and 2, the sandwich 10 shown comprises two layers of bread with an edible filling 16 therebetween. It is considered to be important for the commercial viability of the invention that the layers can be in the form of slices 12, 14 cut from a conventional loaf of bread and thus, as cut, each has crusted portions 38 around its periphery. However, this is by way of example only and the variable nature of the bread product and its filling are described below.

In the present example, two pressing tools 18, 20 are mounted in alignment in a press, not shown. The press has a mechanism which can be actuated to advance the upper tool 18 towards the lower tool 20. Actuation of the mechanism can be manual or with power assistance.

The upper tool 18 comprises a base 22 having a flat, lower face 24 with a substantially rectangular periphery defined by downwardly extending shoulders 26 extending along each edge of the face 24 and intersecting at the corners thereof. Each shoulder terminates in a lower face 36 which is approximately perpendicular to an inner face 34.

The lower tool 20 is substantially identical to the upper tool 18. However, the lower tool is inverted in used. The lower tool 20 thus comprises a base 22' having a flat, rectangular upper face 24' with upwardly extending shoulders 26'. Each shoulder terminates in an upper face 36' which is approximately perpendicular to an inner face 34'.

Cutting blades 46 are mounted about the periphery of the lower tool 20.

In the present example, the length and width of the face 24 of the upper tool 18 are both 100 mm. The depth of the shoulder portion 26 as measured by the distance from the face 24 to each face 36 is 10 mm. The width of each face 36 is 5 mm. The lower tool 20 is substantially identical to the upper tool. As should be obvious, these dimensions are given by way of example only and may vary within wide limits.

The press is operated to raise the upper tool 18 clear of the lower tool 20 as shown in FIG. 1. The sandwich 10 is then inserted in the space between the tools, resting on the sharpened upper edges of the cutting blades 46. The crosssectional size and shape of the loaf, and hence of the slices 18, 20, is chosen so that the slices 18, 20 overlap the peripheries of the tools 18, 20 at least to the extent that the crusted portions 38 of the slices are located outwardly of the cutting blades 46. However, to minimize waste, the size of the slices should only be marginally greater than the size of the tools 18, 20. By way of example, for use with tools 18, 20 of the size described above, the slices may be 125 mm long, 125 mm wide and 10 mm thick.

The press is then operated so that the upper tool 18 is advanced towards the lower tool 20. In the course of this movement, the faces 36 come into contact with the upper slice 12 and further advancement of the upper tool 18 causes the crusts to be cut off by the cutting blades 46 and the two slices 12, 14 to be squeezed together by the faces 36, 36' near the outer edges of the slices. Advantageously the size of the filling 16 should be chosen so that the filling lies within the peripheries of the tools 18, 20 and preferably of the faces 34, 34'. The inner face of the upper slice 12 thus has a peripheral portion 40 located outwardly of the filling which, when the slices are squeezed together, comes into direct contact with the similar portion 42 of the inner face of the lower slice 14.

It has been found that, when the two slices of bread are squeezed together in this manner between tools which are properly designed and with sufficient pressure, a bond is formed between the two slices at their interfacing peripheral portions 40, 42 which are squeezed together between the faces 36, 36' of the tools. This squeezing seals the two layers together and forms a substantially sealed pocket or cavity between the layers of bread inwardly of the outer sealed edges which can hold filling therein. The shape of the sandwich is governed by the profile of the tools 18, 20. In the present example, the tool 18 is advanced to a position in which the distance between the faces 36, 36' is 2 mm. This distance can of course be adjusted as required. The shape of the sandwich so produced is as shown in FIG. 2 and provides a secure bond as well as a pleasing appearance.

There is no need to heat the tools substantially or for any gluing agent to be applied between the two slices. The bond is strong enough to hold the two slices together during subsequent handling and packaging. It is also sufficient to form a seal which prevents the leakage of a constituent of the filling 16 which may become liquid, particularly when the sandwich 10 is heated prior to consumption. This is an advantage of the greatest importance since it is intended that the sandwich 10 should be factory produced and delivered to users in a ready to use form which requires no further preparation other than heating. Such users would include domestic users as well as snack bars and other businesses which offer food products of this kind to the public. Many, if not most of such users will heat the sandwich 10 in a conventional toaster appliance or machine which receives the toast in a vertical disposition. Leakage of liquid from the filling 16 when the sandwich is being heated in such toasters will render the product unacceptable to the market and make the use of a loaf filling such as described below with reference to FIG. 8 impractical.

The cutting blades 46 act as a barrier to prevent pieces of the filling from falling out or being ejected when the sandwich is pressed by the tools 18, 20.

The requirements for ensuring an adequate bond will vary. Amongst the factors which will affect the quality of the bond are:

a. The pressure or squeezing force per unit area applied to the bread and more especially to the peripheral portions 40, 42.

b. The moisture content of the bread. This will be affected by, inter alia, the "bake level" and the freshness of the bread. A 0% bake level represents a fully unbaked product whereas a 100% bake level represents a fully baked product containing less moisture. The moisture content and the bake level affect the pressure required to form an adequate bond.

c. The nature of the bread. As is well known, some breads are light and airy while others are heavy. The thickness of the slices, the solids content of the bread per unit volume and the percentage of such solids which comprise ingredients other than baked dough are all likely to affect the required pressure and also the area over which the two slices must be squeezed together.

d. The presence, accidental or intentional, of matter between the portions 40, 42 which are squeezed together. Matter from the filling 16 could, for example, migrate by dislodgement or squeezing from the center of the sandwich to the periphery.

e. The nature of the filling including the liquid content thereof and any propensity of the filling to expand when heated and thereby apply pressure to the slices.

f. The shape of the pressed together edge portions, which, as already noted, is determined by the shape of the pressing tool.

Because of the wide variations in the above and possibly other factors, it will be necessary to determine by experiment the size and shape of the tools and the pressure to be applied in many cases. However, it has been found that tools of the size and configuration described above can be successfully used with a wide variety of bread types, from light, airy white bread to heavy brown breads. Typically, using slices which are 10 mm thick cut from fresh baked white bread with a moisture content of about 58%, a density of about 0.2 g/cc, and using a filling (comprising a slice of cheese and a slice of ham) which is 3 mm thick the bread slices will bond adequately under a force of 13 kg applied to the upper tool.

A force of 13 kg applied to the upper tool has been calculated to equate to 700 g/cm$^2$ applied to the bread over the area of the faces 36 of the upper tool.

The above quantities are average quantities. Using the same pressing tools, adequate bonding has been found to occur, or may be expected, within a range of values around those quantities. For example, the thickness of the slices of both white and brown bread can vary between 8 mm and 15 mm. The moisture content of the white bread can vary between about 30% and 60% and the density of the white bread can vary between 0.2 and 0.4 g/cc. The quality of the bonding has been found to deteriorate as the bread loses its moisture—bread which is a day old still bonds adequately whereas if bread which is more than three days old is used without being kept fresh as by freezing or the like, the bond is too poor to be reliable. An important variable parameter is the applied pressure. Using the same pressing tools on the white bread mentioned in the example, a force as low as 10 kg applied to the tools was still found to effect an adequate bond between the slices.

Similar results have been achieved when brown bread having the qualities mentioned in the above example was used.

If the crusts are not removed during the pressing operation, the sandwich will have the appearance shown in FIG. 3 after it has been pressed. It will have necked portions 44 where the slices have been pinched and bonded together adjacent their edges by the pressing tools. Although the crusts may be left intact, it is thought that in most cases it will be preferable, from a marketing point of view, to remove the crusts. This can be achieved by one means as noted above. However, it is also possible to cut the crusts off by hand or to provide a cutting tool for removing the crusts. One example of a cutting tool is shown at 46 in FIG. 4. The pressing tools 18, 20 could be provided with a similar cutting tool. The cutting tools are important in forming the edge design.

In another example of an arrangement of pressing tools, the lower tool 20 could be replaced by a similar flat platten. In this case, it might be necessary to increase the depth of the shoulder portion 26 and the width of the vertical flat face 34 of the upper tool 18.

In the pressing operation using the tools 18, 20, the entire sandwich is subject to a degree of compression. This is considered advantageous since the thickness of the sandwich is reduced for fitting into a toaster and its density is increased. It is also given added stiffness and strength since the filling tends to bond to the slices of bread under such compression. This compression could of course be carried out as a separate operation. Advantageously the dimensions of the tools 18, 20 and particularly the depth of the shoulder portions 26, 26' as aforementioned are chosen so that the thickness of the sandwich, after being formed, is such that it can easily be inserted in conventional vertical slot toasting machines.

After the sandwich is removed from the pressing apparatus, it is advantageously subjected to further processing. It may be passed through a heating device which applies grill marks to the outer faces of the slices. Alternatively artificial grill marks could be applied by a roller which rolls a coloring agent in a predetermined pattern simulating grill marks or other decoration on the outer faces of the slices. Alternatively, or in addition, the entire surface of each outer face could be coated with an agent such as butter, margarine or oil containing one or more flavoring agents such as finely divided garlic. This also provides a more uniform browning of the sandwich when it is subsequently toasted prior to consumption.

In some cases, particularly where the filling material becomes less viscous and therefore flowable when heated, the degree of flow that takes place can be reduced by pressing the grill or other marks into the outer faces of the bread, as at 70, FIGS. 15 and 16, to an extent to press the inner faces of the bread toward one another along the marks as at 72, FIG. 15, to form subpockets and restrict flow of filling within the subpocket between the bread slices. The degree of restriction will depend upon the depth of the markings 70, which can be made to cause the desired degree of restriction to flow. A depth of about three millimeters has been found satisfactory in most instances, such as when a cheese filling is used.

Further, if desired, the product can be scored and weakened, such as by perforations, about a break line to enable the sandwich product to be easily broken into desired pieces after heating. Thus, the bread may be pressed together as along line 74 to form a score line and perforations 76 may be added along the score line to further enhance separating of the pieces along such line. The joining of the inside opposing faces of the bread as at 78 prevents leakage of the filling through the perforations. Various patterns and locations of markings and score lines can be used as desired.

Any moisture added to the product is likely to increase the time required to chill or freeze the product after it is made and to heat the product prior to consumption. Excessive moisture may also cause the product to become soggy. Both garlic and butter, as well as the ingredients of the filling, will in most cases add to the moisture content of the product. It is therefore desirable that the butter or other agent should have a low moisture content, preferably less than 16%. Furthermore, if necessary, moisture can be removed form the bread after the layers are bonded together, for example, by passing the sandwich through a dehydrating apparatus. Suitable such apparatus is commercially available.

If a coloring agent is used to form grill or other decorative marks, the coloring agent may be applied by passing the sandwich, immediately after it has been pressed by the tools 18, 20 vertically between a pair of rolls 120 as shown schematically in FIG. 11. The surfaces of the rolls are made up of spiral wire rings which pass through baths 122 of food coloring solution 124. The solution is picked up by the spiral wire rings and transferred to the outer faces of the sandwich in a pattern corresponding to those parts of the wire rings which come into contact with the sandwich.

In somewhat similar fashion, a butter or oil coating mix may be applied by then passing the sandwich vertically between a second pair of rolls 130 shown schematically in FIG. 12. The surfaces of the rolls 130 are absorbent. As the rolls 130 rotate, the absorbent surfaces thereof pick up coating mix 132 from baths 134 and then move past squeeze rolls 136 which press against the absorbent surfaces, squeezing out excess coating mix which drops back into the baths 134. The amount of coating mix which is then transferred to the outer faces of the sandwich by further rotation of the rolls 130 is thus closely controlled. The squeeze rolls are spring loaded so that the force which they apply to the absorbent surfaces of the rolls 130 can be adjusted.

This an advantageous method of applying the coating mix as it is difficult to apply such coatings evenly with the sandwich in horizontal disposition.

After the sandwich is prepared it is advantageously chilled or frozen by standard techniques. The chilling serves to solidify the butter or other coating agent. The sandwich can thus be stored for a long period and remain fresh up to the time it is heated prior to consumption. of course, the grill marks and/or the butter or other coating mix may be applied, and/or the slices may already be chilled, before the sandwich is subjected to the pressing operation.

Although it is thought at present that the invention will have its greatest application to products in the nature of toasted sandwiches and the like which are eaten hot, it is also envisioned that there may be a demand for products which are eaten without being heated (or at least heated above ambient temperature). The invention will still be useful for such products since the fillings for such products may include sauces and the like which are non-liquid when chilled but which become liquid when heated to ambient temperature.

The face 48 of the pressing tools shown in FIG. 4 are indented to form cavities 50 in the tools. The purpose of the cavities can be threefold. First, the cavities enable the tools to accommodate a sandwich which has a thicker filling leading to an increase in the thickness of the center part of the sandwich. Second, the sandwich takes up the shape of the cavities which might increase the customer appeal of the sandwich. The curved shape of the cavities shown is only one example of a shape which could be imparted to the sandwich. Third, it might be desirable to avoid compressing the center part of some sandwiches. For example, some fillings may comprise a sauce with a pasty consistency and which would be ejected if the filling was compressed. This can be avoided by providing cavities which are so deep that their faces do not come into contact with the center part of the sandwich during the pressing operation.

As mentioned briefly above, the nature of the bread may vary widely. As shown in FIG. 5, instead of using two conventional slices of bread, a sandwich 52 can be made up by using a long single slice 56 and folding it over on itself. This allows a larger sandwich to be made from a loaf of bread of given size. Such a slice can be obtained by cutting a conventional loaf lengthwise. This slice is then folded across its middle to form a fold which is located along one edge of the sandwich as indicated at 54. The sandwich 52 so formed need only be sealed along its other three edges. The tools 18, 20 may be modified for this purpose. The shoulder portions 26, 26' along one edge of the tools 18, 20 may be omitted. Alternatively, the tools 18, 20 may be used without modification. They would then press the peripheral portions of the sandwich, including the portion adjacent the fold 54.

Alternatively the sandwich 52 is sealed only along two opposite side edges, leaving the end 59 opposite the fold 56 open. This is particularly useful when the filling is garlic butter applied as described below with reference to FIG. 13. This avoids the need to seal the end which is butter coated and which, if sealed, opens up when heated. The end which opens up is inserted facing upwards in the toaster.

The bread may alternatively be specially prepared for making sandwiches according to the method of the invention. In a more highly automated facility, the bread may be prepared in the form of an extra long loaf which is cut along its length into slices the length of which may, for example, be four times as long as the length of a sandwich. Each end of a single such slice 58 may be folded inwards to form a double sandwich 60 as shown in FIG. 6. This double sandwich comprises two sandwiches 60a, 60b which are separated from each other at the position 62 after the double sandwich has been subjected to the pressing operation for bonding and sealing the peripheral portions together essentially as described above. Special pressing tools will be required for this purpose.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

What is claimed is:

1. A method of producing a sandwich product comprising the steps of bringing together two layers of baked bread with a filling therebetween and using pressing apparatus to cold press edge portions of the layers together so that interfacing portions of the layers adjacent the edge portions become bonded together and remain bonded when the product is removed from the pressing apparatus, wherein the filling is a slice of material which is substantially solid at the time of cold pressing the edge portions and which does not extend into the edge portions of the layers of baked bread.

2. A method according to claim 1, in which the product is prepared by cutting a loaf of bread along its length to form a slice which is folded on itself to form the two layers.

3. A method according to claim 1, in which the two layers are constituted by two slices cut from a loaf of bread.

4. A method according to claim 1, including the step of removing crust from the layers.

5. A method according to claim 4, in which the crust is removed before the layers are bonded together.

6. A method according to claim 1, including the step of applying decorative markings to an outer face of at least one of the layers.

7. A method according to claim 1, including the step of providing at least one bath containing an agent which flavors the product, providing an absorbent roller in conjunction with each of the at least one baths to absorb the agent which flavors the product, providing a squeeze roller in conjunction with each absorbent roller to adjust to a desired degree the amount of agent which flavors the product on the absorbent roller, and passing an outer face of the product against the absorbent roller whereby the agent which flavors the product is applied by the roller to an outer face of at least one of the layers of the product.

8. A method according to claim 1, in which the product is passed through a dehydrating apparatus after it is produced.

9. A method according to claim 1, including the step of chilling and freezing the product after it is produced.

10. A method according to claim 1, in which the filling includes a layer comprised of at least one foodstuff which is or has been divided into pieces which are held together by a binding agent.

11. A method according to claim 10, in which the binding agent is gelatin or a similar agent which is cohesive when it is chilled and which melts when the product is heated above ambient temperature.

12. A method according to claim 1, including the step of heating the product above ambient temperature before the product is consumed.

13. A method according to claim 12, in which the product is heated in a toasting device in which the product is disposed in a substantially vertical orientation when it is heated.

14. A method according to claim 1, in which the pressing apparatus comprises at least one roll member which rolls over the edge portions of the layers and thereby presses them together as the layers pass through the pressing apparatus.

15. A method according to claim 1, in which the pressing apparatus comprises at least two juxtaposed roll members between which the edge portions of the layers pass and which thereby press the edge portions together as the layers pass through the pressing apparatus.

* * * * *